US005996902A

United States Patent [19]

[11] Patent Number: 5,996,902
[45] Date of Patent: Dec. 7, 1999

Morimoto et al.

[54] SPRAY FOR SPRAYING POWDERED MATERIAL ACTIVATED BY PULSATING VIBRATION AIR AND METHOD

[75] Inventors: Kiyoshi Morimoto; Yasushi Watanabe; Kimiaki Hayakawa, all of Shizuoka; Sanji Tokuno, Tokyo, all of Japan

[73] Assignee: Kyowa Hakko Kogyo Co., Ltd., Tokyo, Japan

[21] Appl. No.: 08/878,944

[22] Filed: Jun. 19, 1997

[30] Foreign Application Priority Data

Jun. 21, 1996 [JP] Japan .................................... 8-161553
Jun. 16, 1997 [JP] Japan .................................... 9-158825

[51] Int. Cl.$^{6}$ ...................................................... B05B 17/04
[52] U.S. Cl. .............................. 239/4; 239/99; 239/102.2
[58] Field of Search .............................. 239/4, 99, 102.1, 239/659; 222/195, 630, 637; 406/85, 127

[56] References Cited

U.S. PATENT DOCUMENTS

| | | | |
|---|---|---|---|
| 3,189,280 | 6/1965 | Drayer | 239/102.1 |
| 3,976,332 | 8/1976 | Fabel | 222/195 |
| 4,420,279 | 12/1983 | Easley, Jr. | 406/14 |
| 4,533,082 | 8/1985 | Maehara et al. | 239/102 |
| 5,152,456 | 10/1992 | Ross et al. | 239/102.2 |
| 5,332,337 | 7/1994 | Wilde et al. | 406/24 |

FOREIGN PATENT DOCUMENTS

| | | | |
|---|---|---|---|
| 2 270 070 | 12/1975 | France . | |
| 2042115 | 3/1972 | Germany | 406/127 |
| 24 37 856 | 2/1976 | Germany . | |
| 3418997A1 | 11/1985 | Germany . | |
| WO95/00254 | 1/1995 | WIPO | 239/102.1 |

*Primary Examiner*—Andres Kashnikow
*Assistant Examiner*—Jorge Bocanegra
*Attorney, Agent, or Firm*—Jones, Tullar & Cooper, P.C.

[57] ABSTRACT

A sprayer and method for spraying powdered material activated by pulsating vibration air. The sprayer comprises an elastic membrane, a storage tank for storing powdered material provided with the elastic membrane at the bottom opening, and a pulsating vibration air generator for supplying pulsating vibration air to the elastic membrane. The sprayer so constructed is designed to uniformly and diffusely spray the powdered material stored in the storage tank when the elastic membrane is forcedly vibrated up and down in compliance with the frequency of the pulsating vibration air by receiving pulsating vibration air from the pulsating vibration air generator.

14 Claims, 5 Drawing Sheets

FIG. 1
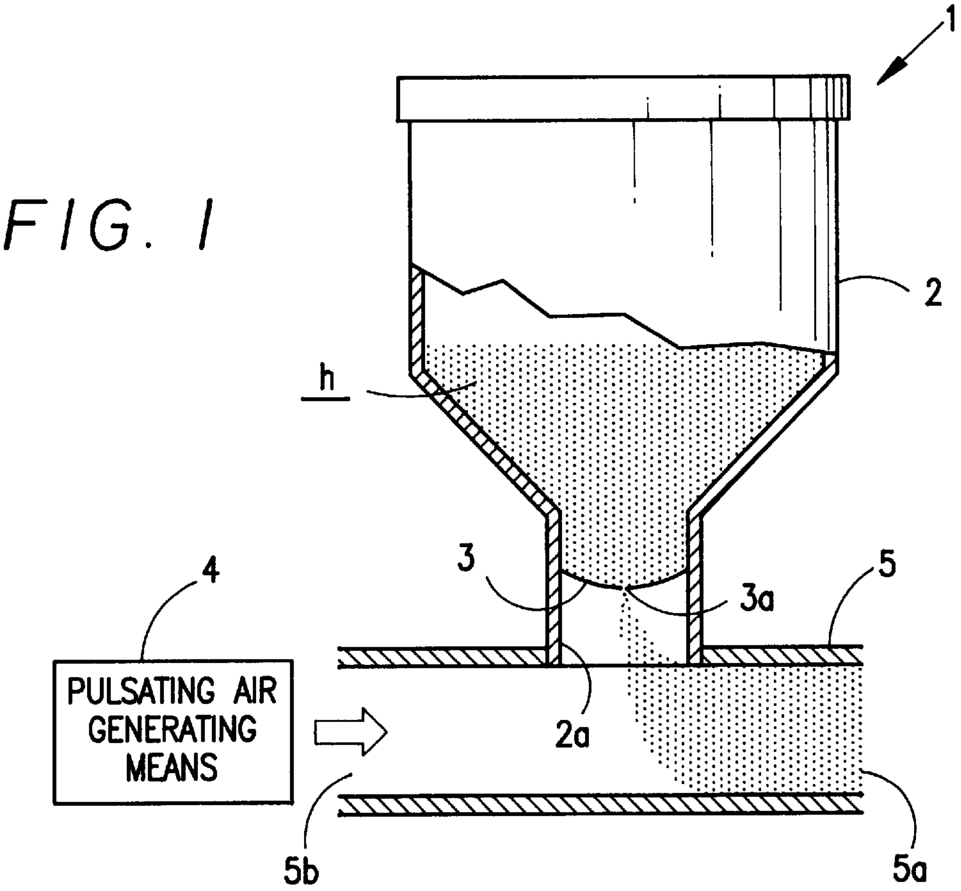
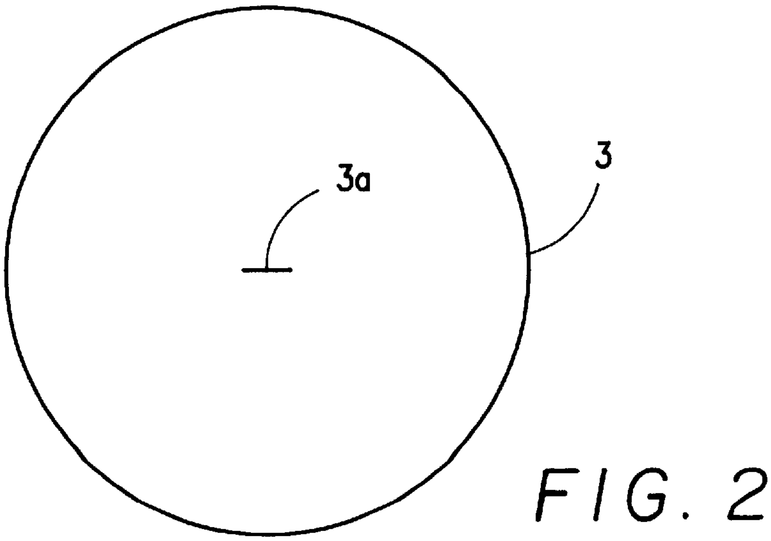
FIG. 2

SPRAY FOR SPRAYING POWDERED MATERIAL ACTIVATED BY PULSATING VIBRATION AIR AND METHOD

BACKGROUND OF THE INVENTION

I. Field of the Invention

This invention relates to a newly developed sprayer and method for spraying powdered material in an extremely small quantity activated by pulsating vibration air, and more particularly to a sprayer for spraying bulky and soft powdered material with large specific volume or powdered material with poor fluidity without causing clogging.

II. Prior Art

Manufacturing of tablets is generally comprised of a weight, mixing, granulation, tableting and inspection process. A trace of an additive, which is described in a statement of the powers of medicine, is added to the basis of the medicine in the process of mixing or tableting.

A sprayer for effectively spraying powdered material in extremely small quantities has been disclosed in Japanese Patent Application H6-10187 (filed on Feb. 1, 1994).

This sprayer as shown in FIG. 7, is provided with a storage tank a with a valve f at the bottom end in which powdered material h is stored. The sprayer is also provided with a reservoir c which has a body for storing the powdered material h, a filter cloth b formed with at least plural bores g at the tip end, and a gas feeding means d.

According to the sprayer so constructed, powdered material h can be continuously sprayed through the bores g when the filter cloth b of the reservoir c is forcedly vibrated by a vibrator e while driving gas is fed into a communication pipe i from the gas feeding means d.

However in such a sprayer, bulky and soft powdered material with a large specific volume, in which the ratio of air to powder is rather large, or a powdered material with poor fluidity, cannot be sprayed for a long period without causing clogging since such powdered material stored in the reservoir c would be caught in the bores g of the filter cloth b while the sprayer is repeatedly used. Namely, clogging has often been caused in such a sprayer. Further, considerable time is needed in that the powdered material thus attached to the filter cloth b amounts to a constant quantity, and sprayer amount per unit time becomes constant.

SUMMARY OF THE INVENTION

The present invention has been proposed to solve the above-mentioned problems. Accordingly, the primary object of present is to provide a sprayer for spraying powdered material activated by pulsating vibration air with a simple construction wherein even bulky and soft powdered material with large specific volume in which the ratio of air to powder is rather large, or the powdered material has poor fluidity can be sprayed quantitatively and continuously without causing clogging, and to a method for spraying powdered material using the sprayer of the present invention.

According to the sprayer for spraying powdered material activated by pulsating vibration air in the present invention, the sprayer comprises an elastic membrane formed with an opening, a storage tank for storing powdered material provided with the elastic membrane at the bottom opening, and a pulsating vibration air generating means for supplying pulsating vibration air to the elastic membrane. The sprayer so constructed is designed to uniformly and diffusely sprayer powdered material stored in the storage tank from the opening of the elastic membrane when the elastic membrane is forcedly vibrated up and down when receiving pulsating vibration air from the pulsating vibration air generating means.

According to the sprayer of the present invention, the opening of the elastic membrane is a cut opening and is formed at the center of the elastic membrane.

According to the sprayer of the present invention, the opening of the elastic membrane is comprised of plural little bores with various shapes or almost equal shape.

Also proposed is a separate sprayer of the present invention, in which a communication pipe communicating with the bottom opening of the storage tank is further provided and has at one end an injection port and at the other end a connecting port to the pulsating vibration air generating means. The elastic membrane is forcedly vibrated up and down to make the opening of the elastic membrane open and close when the pulsating vibration air generating means is activated so that the powdered material is uniformly and diffusely sprayed from the injection port.

It is still further proposed to provide a sprayer for spraying powdered material in which its application is specified for spraying lubricant on medical tablets when they are manufactured.

With the present invention, there is no trouble from cross contamination since the spray is provided with no mechanical driving means like a vibrator. And there is no trouble of causing clogging since the cut opening or the little bores respectively formed in the elastic membrane opens in such a manner that the opening or the bores are deformed to widely open only when emitting the powdered material stored in the tank. In addition, there is no trouble nor inclination that the powdered material stored in the storage tank remain since the elastic membrane itself, which constitutes a bottom of the storage tank, is vibrated up and down so as to emit all the powdered material stored in the storage tank.

Also, according to the present invention, one advantage is that controlling of the amount of spraying is very easy and accurate by only controlling the application of pulsating vibration air. Another advantage is that soft powdered material with large specific volume in which the ratio of air to powder is relatively large, or powdered material with poor fluidity can be uniformly and quantitatively sprayed without causing clogging by applying pulsating vibration air which has vibration energy to move the elastic membrane up and down in relatively large quantity.

Further according to the present invention, cleaning is not required and maintenance is easy because the filter cloth which has been used in the prior known sprayer isn't necessary. Furthermore, with the present invention, the construction of the sprayer can be simplified because vibration means like a vibrator aren't necessary at all. Still further with the present invention, even liquid-like or slurry material can be stored in the storage tank for spraying.

On the contrary in the prior art, as far as the inventors know, liquid-like material could not be continuously sprayed without causing clogging due to the leakage of material from the filter cloth provided with the tank.

BRIEF DESCRIPTION OF THE DRAWINGS

FIG. 1 is a vertical sectional view of a sprayer for spraying powdered material activated by pulsating vibration air according to the invention.

FIG. 2 is a plan view of one embodiment of an elastic membrane. (claim 2)

DETAILED DESCRIPTION OF A PREFERRED EMBODIMENT

Figure 3A:
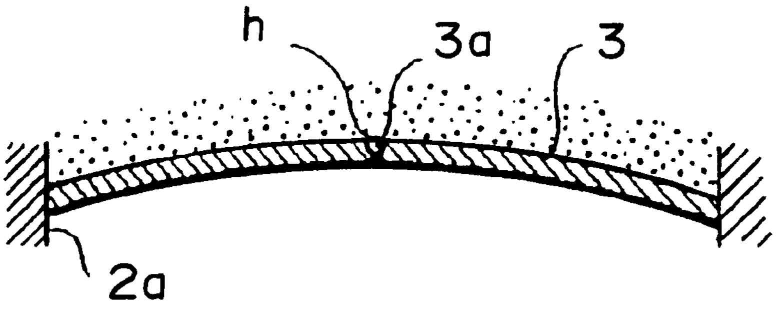
FIGS. 3(*a*)–(*c*) show how the elastic membrane is operated when receiving pulsating vibration air.

Preferred embodiment of the present invention will be described referring to the drawings.

FIG. 1 shows construction of a spray with a tank for storing powdered material according to the present invention. FIG. 2 is a plan view of an elastic membrane with a cut opening and FIGS. 3(*a*)–(*c*) show how the elastic membrane works when pulsating vibration air is supplied.

As seen from the drawings, a tank 2 is formed with a narrowed bottom and has a storage body for storing powdered material h. And the storage body has a bottom opening 2*a* which is provided with an elastic membrane 3 formed a cut opening 3*a* in the center. The elastic membrane 3 is preferably made of soft thin Teflon plate or thin silicon plate and has the cut opening 3*a* which may be formed by using a sharp edged tool such as a razor. The size of the cut opening 3*a* is appropriately defined in accordance with the particle diameter of powdered material to be sprayed. The applicant has perceived that 2 mm–3 mm diameter in the size of the cut opening 3*a* is preferable when particle diameter is 250 $\mu$m and spray amount per unit time is about 1 g/minutes.

Pulsating vibration air is fed from a pulsating vibration air generating means 4 provided at one end 5*b* of a communication pipe 5 and is supplied into the elastic membrane 3 from downward. The communication pipe 5 is provided at one end with an injection port 5*a* provided for spraying. Wave height and frequency of pulsating vibration air should be defined according to the physical property of powdered material h to be sprayed and the elastic membrane 3. As to the value of the frequency of pulsating vibration air, relatively low value should be set in order to give large vibration to the elastic membrane 3. For example, frequency from 10 Hz to 40 Hz will be preferable. According to such constructed spray 1, the elastic membrane 3 is forcedly vibrated up and down in compliance with the frequency of the pulsating vibration air when the elastic membrane 3 receives pulsating vibration air, and in the mean time the periphery of the membrane 3 is deformed to make a node and whereas the center part around the cut opening 3*a* is deformed to make an antinode as shown in FIG. 3(*a*) and FIG. 3(*c*).

Figure 3B:
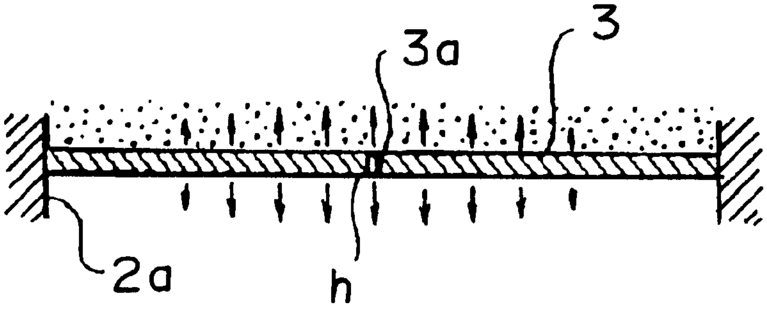
Figure 3C:
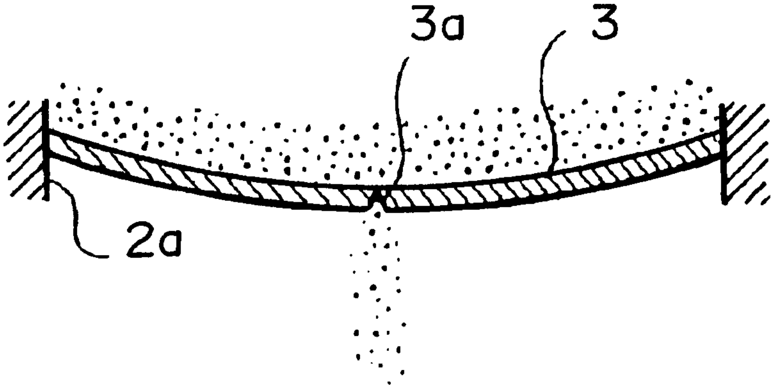

FIG. 3 shows more clearly how the elastic membrane 3 works at this time, namely when the elastic membrane 3 receives the pulsating vibration air. As shown in FIG. 3(*a*), when the elastic membrane 3 is elastically deformed like it is lifted up, the cut opening 3*a* is widened in the upper end and is closed in the bottom end so that the cut opening 3*a* is deformed to open in V-shaped form. Namely, the cut opening 3*a* opens in such a manner that the cut end facing to the inner side of the tank 2 is widened and the other cut end facing to the inner side of the communication pipe 5 is closed. As the result, the powdered material h stored in the tank 2 easily enters into the V-shaped cut opening 3*a*. And then the elastic membrane 3 is elastically deformed like it is pushed down as shown in FIG. 3(*c*) after the elastic membrane 3 returns to a neutral position where the powdered material stuck in the cut opening 3*a* is once tightly held in the cut opening 3*a* as shown in FIG. 3(*b*) and in the mean time the cut opening 3*a* is widened in the bottom end and is closed in the upper end so that the cut opening 3*a* is deformed to open in versa V-shaped form as shown in FIG. 3(*c*). As the result, powdered material held in the cut opening 3*a* is energetically emitted from the versa V-shaped cut opening 3*a*. According to the spray of the present invention, the powdered material stored in the tank 2 can be accurately sprayed from the injection port 5*a* in compliance with the frequency of the pulsating vibration air while the elastic membrane 3 receives pulsating vibration air via the communication pipe 5 from the pulsating vibration air generating means 4.

In other words, according to the spray 1 of the present invention, the elastic membrane 3 can be vibrated up and down to make an antinode and a node in a well known manner like oscillation technology so that the cut opening 3*a* repeatedly holds and emits powdered material h stored in the tank 2 every time the cut opening 3*a* opens and closes by receiving pulsating vibration air. As the result of such operation of the membrane 3, even liquid-like or slurry powdered material stored in the tank 2 can be uniformly and diffusely sprayed from the cut opening 3*a* without causing clogging.

Therefore, spray amount of the powdered material can be accurately controlled by varying the frequency of the wave height of the pulsating vibration air. Further, bulky and soft powdered material with large specific volume in which the ratio of air to powder is rather large, even liquid-like material or slurry material can be quantitatively and continuously sprayed without causing clogging.

In the above-mentioned embodiment, the cut-opening is formed at the center of the elastic membrane, but plurality of bores may be formed around the center thereof.

Figure 4:
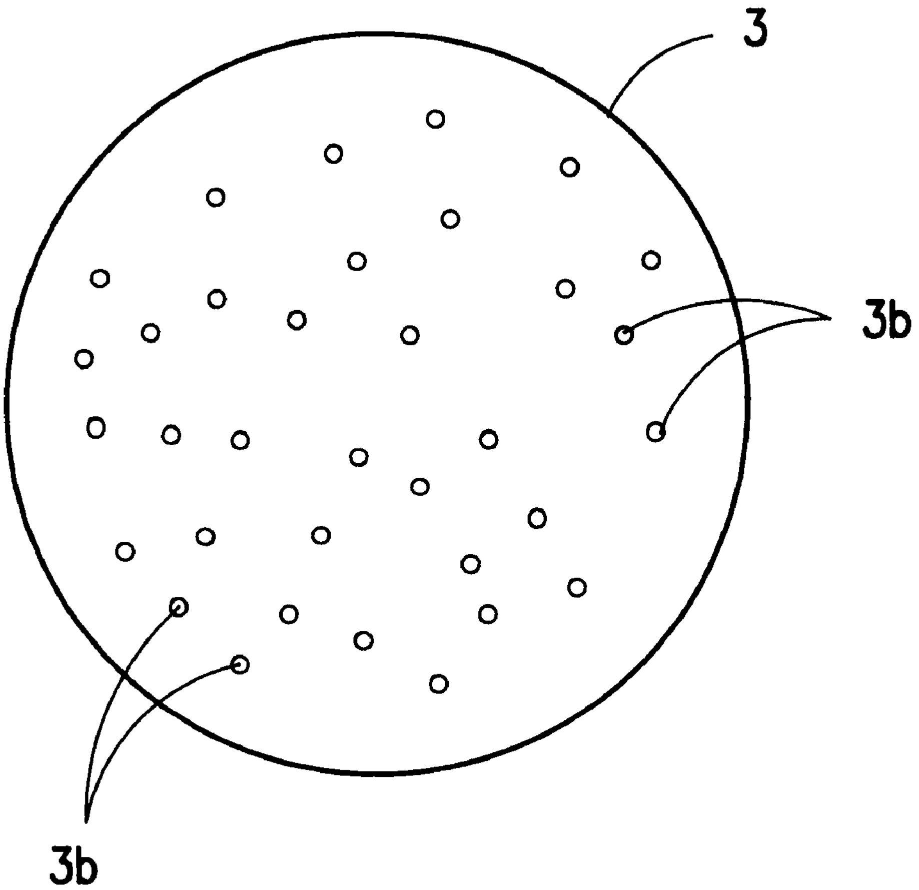
FIG. 4 is a plan view of a separate embodiment of an elastic membrane. (claim 3)

FIG. 4 is a plan view of an elastic membrane 3 with plural little bores 3*b*. This elastic membrane 3 is attached to the bottom opening 2*a* of the tank 2 like the above-mentioned embodiment. The plural little bores 3*b* are made by punching all around the center and the surface of the elastic membrane 3. The bores may be made in various shapes or almost equal shape. When pulsating vibration air is supplied from the bottom of the tank 2, the elastic membrane 3 is forcedly vibrated up and down in compliance with the frequency of the pulsating vibration air, while the center of the elastic membrane 3 is deformed to make an antinode and the periphery of the elastic membrane 3 is deformed to make a node like an above-mentioned manner.

In the above-mentioned embodiment, the size of the bores of the elastic membrane is almost the same but the size may be differed.

In this embodiment, powdered material h can be emitted quantitatively and continuously in extremely small quantity through the bores 3*b* without causing clogging. Accordingly, spray amount of the powdered material stored in the tank 2 can be accurately controlled even in extremely small quantity by varying the frequency or the wave height of the pulsating vibration air. And further, even liquid-like material or slurry material can be emitted through the bores 3*b* quantitatively and continuously without causing clogging. In this embodiment, the diameter of the bores 3*b* should be defined so preferable as not to drop the powdered material through the bores 3*b* when the pulsating vibration air is not supplied, namely when the elastic membrane 3 is at a standstill. For example, the diameter of the bores 3*b* will be preferably defined as 0.5 mm or so. According to this embodiment, it is more suited for quantitatively spraying powdered material in relatively large quantity in which the size of the particle is relatively large compared with the above-mentioned embodiment, namely the spray having the elastic membrane 3 with the cut opening 3*a*.

Figure 5:
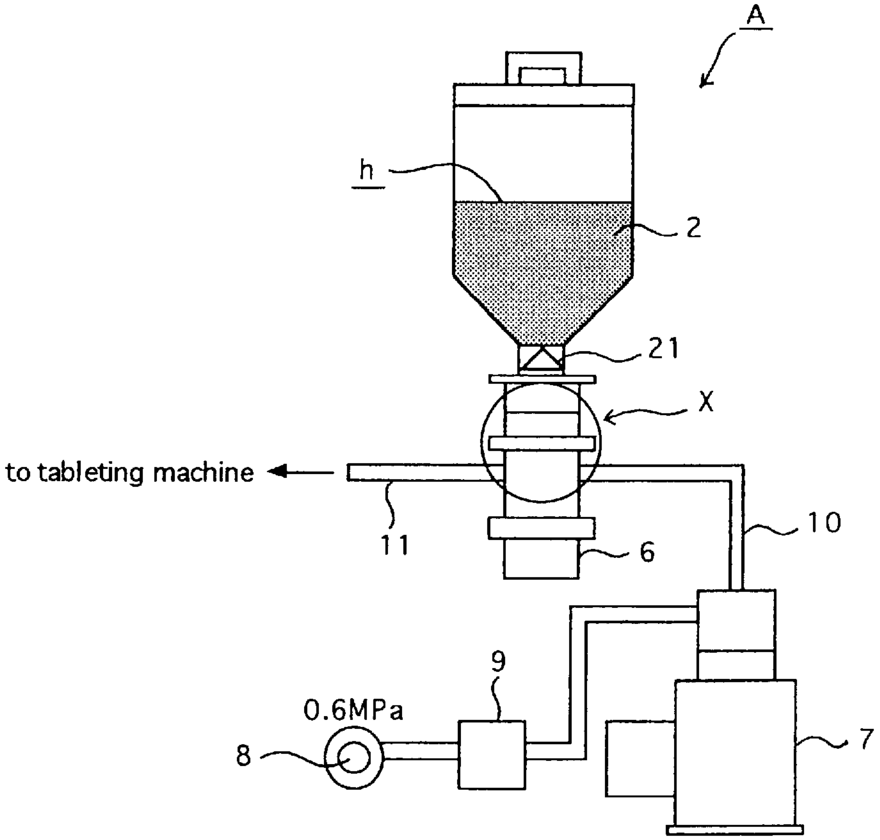
FIG. 5 shows one example of sprayer for spraying lubricant activated by pulsating vibration air according to the present invention.
Figure 6:
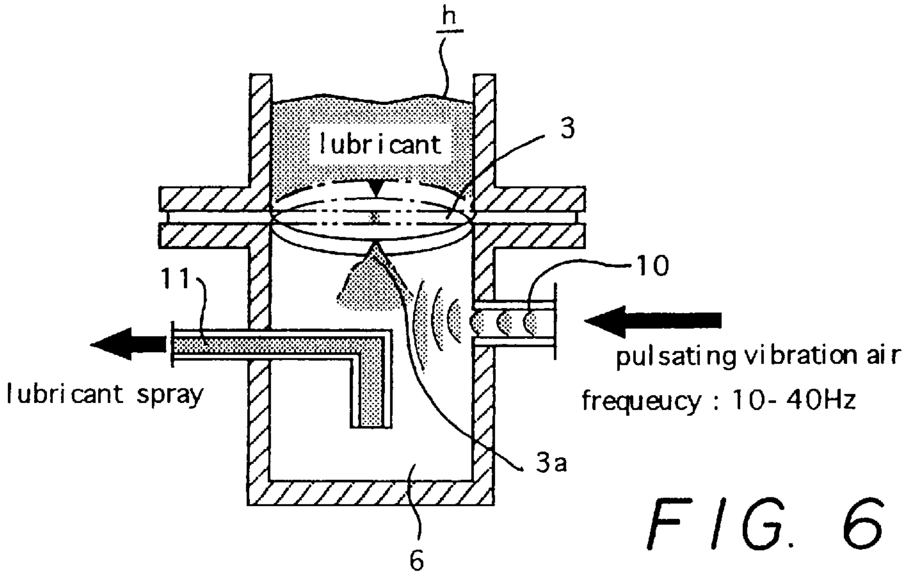
FIG. 6 is an enlarged vertical sectional view of "X" in FIG. 5.
Figure 7:
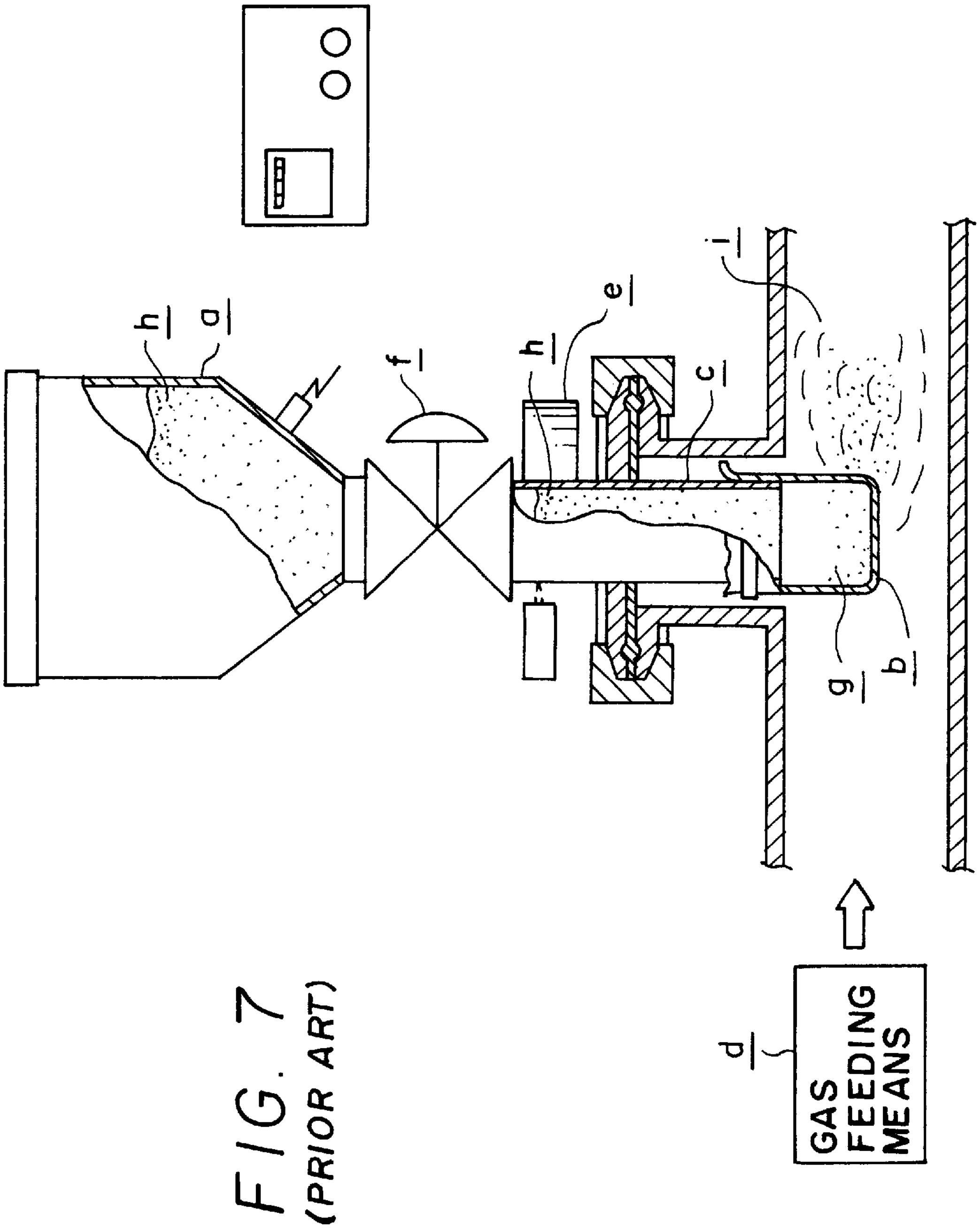
FIG. 7 is a front view, partially in section, of the prior art of the sprayer means for spraying powdered material.

FIG. 5 and FIG. 6 show other example of a spray for continuously supplying lubricant to a tableting machine when medical tablets are manufactured. Such a spray A is used for spraying lubricant on a die and a punch of a tableting machine. An elastic membrane 3 is provided at the bottom of a lubricant hopper 2 with a supply valve 21 thereunder. A diffusing chamber 6 is further provided under the valve 21 and is connected with an air conduit 10 connecting to a pulsating vibration air generator 7 and a spray conduit 11 for feeding lubricant to the tableting machine. The pulsating vibration air generator 7 is connected with an air supply source 8 such as a compressor via a flow control means 9, whereby transport air supplied from the air supply source 8 is fed together with pulsating vibration air to the diffusing chamber 6 through the air conduit 10.

According to the above-mentioned construction, when only the air supply source 8 is driven, the elastic membrane 3 may not be vibrated up and down. Therefore, transport air fed to the diffusing chamber 6 from the air supply source 8 is supplied to the tableting machine through the spray conduit 11 so that powdered material remained in the diffusing chamber 6 or attached on a part of the tableting machine can be blown and cleaned. In this case, when the supply valve 21 of the lubricant hopper 2 is closed, the lubricant h would not fall into the diffusing chamber 6 even if the transport pressure of the transport air introduced from the air supply source 8 to the diffusing chamber 6 is increased. As the result, drying and cleaning of the spray by means of highly pressurized air may be possible.

However, when the pulsating vibration air generator 7 is driven in addition to the air supply source 8, the elastic membrane 3 vibrates up and down since the transport air has vibration energy enough to vibrate the elastic membrane 3. Then, the lubricant h falls in the diffusing chamber 6 continuously to be sprayed therein and the sprayed lubricant h can be fed to the tableting machine through the spray conduit 11 following the flow of the transport air.

[Experiment]

One example of the experiment executed by the present inventors will be explained hereinafter.

The value of the spray amount per minute (mg/min) and the value of the CV (coefficient of variation) of the sprayed material obtained from the experiment are as described in Table 1 where the number or the positioning of each cut opening and bores are varied, and stearin acid magnesium with average diameter of 10 μm which may be used for lubricant as the powdered material to be sprayed and an elastic membrane with 38 μm in diameter and 1.0 mm in thickness are employed. In this case, pulsating vibration air with 20 Hz frequency and 0.2 MPa pressure is also employed.

The result is as follows;

TABLE 1

| Kind of Bore | Number | Position | Amount (mg/min) | CV(%) |
|---|---|---|---|---|
| Sample 1 cut opening (2 mm slit) | 1 | center | 800 | 3–4 |
| Sample 2 little bore (φ 0.5 mm) | 1 | center | 300 | 12–15 |
| Sample 3 little bores (φ 0.5 mm) | 5 | around the center | 1000 | 10–15 |

As seen from the Table 1, it should be noted that the CV of sample 1 with a cut opening is smaller than the sample 2 or 3 comparing with each sample, namely the former is one forth or one fifth of the latter and the spraying amount of the former is also stabler than that of the latter. It is assumed that it depends on the fact sample 1 with a cut opening is larger in deforming rate than sample 2 or 3 with bores and therefore it rarely causes plug up or clogging trouble in sample 1. The table also shows that the more the bores increases in number, the larger the amount of the spraying is, however the amount of the spraying is not proportional to the number of the bores. From the view of the applicant's analysis, it is also assumed that the oscillation amplitude of the elastic membrane becomes larger in the part near the center and smaller in the part further departing from the center so that the opening rate of the bores also becomes smaller in the part further departing from the center than in the part near center. And it has been confirmed by the experiment that the spraying amount decreases when the cut opening is shiftedly made in the part departing from the center of the elastic membrane.

It should be also noted that the diameter of the little bores formed in the elastic membrane is dependently defined upon that the bores don't allow the powdered material to drop out of the bores when pulsating vibration air is not applied and it depends on the physical characteristics of the powdered material to be sprayed. In the experiment executed by the applicant in which stearin acid magnesium is used as the powdered material to be sprayed, the elastic membrane with bores whose diameter is maximumly 1.0 mm are employed.

According to the spray means of the present invention wherein such an elastic membrane is used as an injection valve, the elastic membrane is once expanded at the beginning of air supply when steady flow is supplied to the elastic membrane. However, the deformation of the elastic membrane doesn't appear. The powdered material drops out of the opening or bores of the elastic membrane but it doesn't occur continuously because the elastic membrane keeps its expanded shape. However, when pulsating vibration air is supplied, the elastic membrane vibrates up and down regularly according to the frequency of pulsating vibration air as mentioned above. In this case continuous and quantitative cut-out operation is generated so that powdered material stored over the elastic membrane is continuously sprayed out of the bores to under the elastic membrane. Therefore, the spray amount of powdered material can be accurately controlled by varying the number of bores, the position of bores or cut opening, and the frequency of pulsating vibration air.

The elastic membrane with the cut opening at the center thereof can execute the most accurate control as mentioned above.

We claim:

1. A sprayer for spraying powdered material, comprising:

a pulsating vibration air generation means;

a communication pipe connected at one end to said pulsating vibration air generation means and at the other end having an exhaust opening; and a storage tank connected to the middle portion of said communication pipe, for storing and feeding powdered material, said storage tank having a discharge port provided with an elastic membrane with at least one opening at the bottom thereof, said elastic membrane being constructed to be vibrated up and down to feed said powdered material stored in said storage tank into said communication pipe, whereby powdered material stored in said storage tank is fed into said communication pipe through said elastic membrane, is uniformly mixed with said pulsating vibration air from said pulsating vibration air generation means and is continuously sprayed from said exhaust opening.

2. The sprayer for spraying powdered material as set forth in claim 1, wherein said opening of said elastic membrane is a cut opening formed at the center of said elastic membrane.

3. The sprayer for spraying powdered material as set forth in claim 1, wherein said opening of said elastic membrane is comprised of plural little bores with various shapes or almost equal shape.

4. The sprayer for spraying powdered material activated by pulsating vibration air as set forth in claim 1, further comprising:

an injection port for spraying the powdered material mixed with the pulsating vibration air supplied in said communication pipe, said injection port being provided for said exhaust opening at the end of said communication pipe.

5. The sprayer for spraying powdered material as set forth in claim 1, wherein said powdered material is a lubricant to be sprayed on medical tablets in the process of manufacturing medical tablets.

6. A method for spraying powdered material comprising the steps of:

filling a storage tank with powdered material;

supplying pulsating vibration air into a communication pipe connected to the storage tank at the middle portion in which the communication pipe is at one end connected to pulsating vibration air generating means and the other end has an exhaust opening, and the storage tank has a discharge port provided with an elastic membrane with at least one opening at the bottom thereof;

vibrating the elastic membrane up and down by the pulsating vibration air to thereby feed powdered material stored in the storage tank into the communication pipe; and supplying the powdered material for the communication pipe through the opening, whereby the powdered material fed into the communication pipe through the elastic membrane is uniformly mixed with said pulsating vibration air and is continuosly sprayed from the exhaust opening.

7. The method for spraying powdered material as set forth in claim 6, wherein said opening of said elastic membrane is a cut opening formed at the center of said elastic membrane.

8. The method for spraying powdered material as set forth in claim 6, wherein said opening of said elastic membrane is comprised of plural little bores with various shapes or almost equal shape.

9. The method for spraying powdered material as set forth in claim 6, wherein said powdered material is lubricant to be sprayed on medical tablets in the process of manufacturing medical tablets.

10. The sprayer for spraying powdered material as set forth in claim 2, wherein said powdered material is a lubricant to be sprayed on medical tablets in the process of manufacturing medical tablets.

11. The sprayer for spraying powdered material as set forth in claim 3, wherein said powdered material is a lubricant to be sprayed on medical tablets in the process of manufacturing medical tablets.

12. The sprayer for spraying powdered material as set forth in claim 4, wherein said powdered material is a lubricant to be sprayed on medical tablets in the process of manufacturing medical tablets.

13. The method for spraying powdered material as set forth in claim 7, wherein said powdered material is a lubricant to be sprayed on medical tablets in the process of manufacturing medical tablets.

14. The method for spraying powdered material as set forth in claim 8, wherein said powdered material is a lubricant to be sprayed on medical tablets in the process of manufacturing medical tablets.

* * * * *

UNITED STATES PATENT AND TRADEMARK OFFICE

CERTIFICATE OF CORRECTION

PATENT : 5,996,902

DATED : December 7, 1999

INVENTOR(S) : Kiyoshi Morimoto, et al.

It is certified that error appears in the above-identified patent and that said Letters Patent is hereby corrected as shown below:

On title page, item 54 Title
replace "SPRAY" with -- SPRAYER --;

Claim 4, lines 1 and 2, delete "activated by pulsating vibration air".

Signed and Sealed this

Fifteenth Day of May, 2001

Attest:

NICHOLAS P. GODICI

*Attesting Officer* *Acting Director of the United States Patent and Trademark Office*